United States Patent [19]

Akselrud et al.

[11] Patent Number: 5,112,212
[45] Date of Patent: May 12, 1992

[54] SHOOTING POT WITH COMBINED VALVE AND PISTON

[75] Inventors: Vitaly Akselrud, Richmond Hill; Stefan von Buren, Toronto, both of Canada

[73] Assignee: Husky Injection Molding Systems Ltd., Bolton, Canada

[21] Appl. No.: 694,766

[22] Filed: May 2, 1991

[51] Int. Cl.$^5$ .................................. B29C 45/02
[52] U.S. Cl. .......................... 425/557; 425/130; 425/561; 425/562
[58] Field of Search ............... 425/130, 135, 145, 557, 425/559, 561, 562, 564, 572, 588; 264/328.19

[56] References Cited

U.S. PATENT DOCUMENTS

| | | | |
|---|---|---|---|
| 4,078,875 | 3/1978 | Eckardt | 425/557 |
| 4,080,147 | 3/1978 | Dumortier | 425/561 |
| 4,717,324 | 1/1988 | Schad et al. | 425/562 |
| 4,789,318 | 12/1988 | Ehritt | 425/130 |
| 4,863,369 | 9/1989 | Schad et al. | 425/558 |

FOREIGN PATENT DOCUMENTS

| | | | |
|---|---|---|---|
| 56-93528 | 7/1981 | Japan | 425/561 |
| 59-81144 | 5/1984 | Japan | 425/561 |

Primary Examiner—Jay H. Woo
Assistant Examiner—James P. Mackey
Attorney, Agent, or Firm—Bachman & LaPointe

[57] ABSTRACT

A metering device, a shooting pot, useful in the hot runner system of an injection molding machine including a piston cylinder assembly where the piston is movable in a first direction to effect a valve action and in a second direction to advance a metered volume of thermoplastic material.

15 Claims, 3 Drawing Sheets

SHOOTING POT WITH COMBINED VALVE AND PISTON

BACKGROUND OF THE INVENTION

The present invention relates to injection molding machines and relates in particular to those machines which include a hot runner system composed of a plurality of conduits for serving a plurality of mold cavities with thermoplastic material where there is a conduit individual to each mold cavity.

The invention relates further to a so called shooting pot or metering device incorporated in a conduit for advancing precise quantities of thermoplastic material to each mold cavity, on a cavity by cavity basis.

Typical prior art shooting pots or metering devices are disclosed and described in U.S. Pat. Nos. 4,717,324, 4,775,308, 4,808,101 and 4,863,665, assigned to Husky Injection Molding Systems Inc., to which the present application is assigned.

To aid in establishing the setting or background of the present invention, U.S. Pat. No. 4,717,324 to Schad et al., is incorporated herein by this reference thereto.

In these prior art devices, plastic material is introduced into a shooting pot from a source under the control of a conduit or channel valve which is independent of the shooting pot, per se.

That is, the valve means in a given hot runner conduit is located between the plastic material source and the shooting pot upstream of the shooting pot.

Valve means of various types are employed to prevent backflow of the resin in the cylinder or shooting pot. Obviously, the channel used to fill the cylinder must be blocked when the cylinder's piston is moved forward to discharge or inject the resin into the subsequent downstream channel, nozzle, and ultimately, the mold cavity. This valving is typically achieved by either a check valve in the supply channel or a rotary or sliding valve actuated to block the supply channel.

These devices have inherent disadvantages. Check valves require some backflow of the resin to cause them to close. This reduces the amount of resin in the cylinder by some variable amount and consequently reduces the accuracy of the metering of the resin being injected into the mold. The known volume of the cylinder controlled by the back position of the piston during filling is compromised by this small backflow of resin to cause the check valve to operate.

Rotary and sliding valves invariable leak resin or seize up. It is very difficult to control the clearances in these moving assemblies to prevent leakage and avoid seizing. These components operate at elevated temperatures and thermal expansion causes them to change size, sometimes sufficiently to seize. Although this expansion can be predicted for a known temperature of operation, sometimes this expected temperature is not the one at which the device is ultimately operated. Also processing a different resin may require a different operating temperature and consequently a different thermal expansion of the valve components.

A further disadvantage of prior art valve mechanisms is that they occupy valuable space inside the hot runner system.

SUMMARY OF THE INVENTION

Therefore, it is an object of the present invention to provide a shooting pot assembly which eliminates the above disadvantages.

A further object of the invention is to incorporate a valve means into the shooting pot assembly.

A shooting pot normally includes a cylinder means having a reservoir means and a piston movable in said cylinder means wherein the piston is operable to advance thermoplastic material from said reservoir to a mold nozzle and thence to an adjoining mold cavity.

It is a still further feature of the present invention to provide a shooting pot piston means which is movable in at least two directions.

A further feature of the invention is the provision of a shooting pot piston means which operates dually (1) as a valve means, and (2) as a means for advancing thermoplastic material.

That is, the piston means moves in one direction to effect a valving action and operates in a second direction to advance thermoplastic material.

A further feature of the invention is the provision of a shooting pot assembly having at least two reservoirs, i.e., first reservoir and second reservoir.

A further feature of the invention is the provision of a shooting pot piston means which is movable in a linear direction and in a rotary direction.

A still further feature of the invention is the provision of means for rotating the piston to effect a valve action and means for reciprocating the piston to charge a mold cavity.

It is a further feature of the invention to provide control means for regulating cyclic multi-directional movement of the piston means from (1) a first position wherein inlet means to said first reservoir is open to (2) a second position wherein said inlet means is closed, to (3) a third position where the piston means is operable to expel a precise quantity of thermoplastic material from said first reservoir towards a nozzle means.

A further feature of the invention is the provision of a valve stem in a nozzle means whose operation is synchronized with the cyclic operation of said piston means.

A still further feature of the invention is the provision of a piston means having a recess therein defining said second reservoir providing a connection between the inlet means and said first reservoir when said inlet means is in the open condition.

A further feature of the invention is the utilization of the cyclic flow of thermoplastic material from its source to said first reservoir to purge said second reservoir to limit the interval during which said material is static in said second reservoir.

A further feature of the invention is the provision of movable piston means in a shooting pot or metering device with means for rotating said piston clockwise and counterclockwise in cyclic fashion and with means for reciprocating said piston in similar fashion whereby the piston means cycle of operation includes piston movement from a first position, in which conduit inlet means is open, to a second position, wherein conduit inlet means is closed, to a third position, in which material in said first reservoir is expelled, and returns to said first position with control means operable to regulate operation of a nozzle valve relative to movement of said piston to said third position simultaneously or sequentially.

A further advantage of the combined piston and valve arrangement of the present invention is that space requirements in the hot runner system are reduced substantially.

A metering device embracing certain principles of the present invention designed for inclusion in a conduit means for advancing precise quantities of thermoplastic material from a source such as an injection apparatus to a mold cavity via a hot runner system including a nozzle means having a valve stem communicating with said mold cavity may comprise a cylinder means, a first reservoir in said cylinder means for receiving said thermoplastic material, said first reservoir having inlet means communicating with said source and outlet means communicating with said nozzle means, a piston means movable in said cylinder means, means for rotating and means for reciprocating said piston means, said piston means being movable in a first direction from a first position wherein said inlet means is open to a second position wherein said inlet means is closed by valve action of said piston means, said piston means being movable further in sequence in a second direction to a third position operable to expel said thermoplastic material from said first reservoir toward said nozzle means whereby said piston means is operable dually to effect valve action and as a means for advancing said thermoplastic material.

Other features and advantages of the present invention will become more apparent from an examination of the succeeding specification when read in conjunction with the appended drawings, in which;

DETAILED DESCRIPTION OF THE PREFERRED EMBODIMENT

Figure 1:
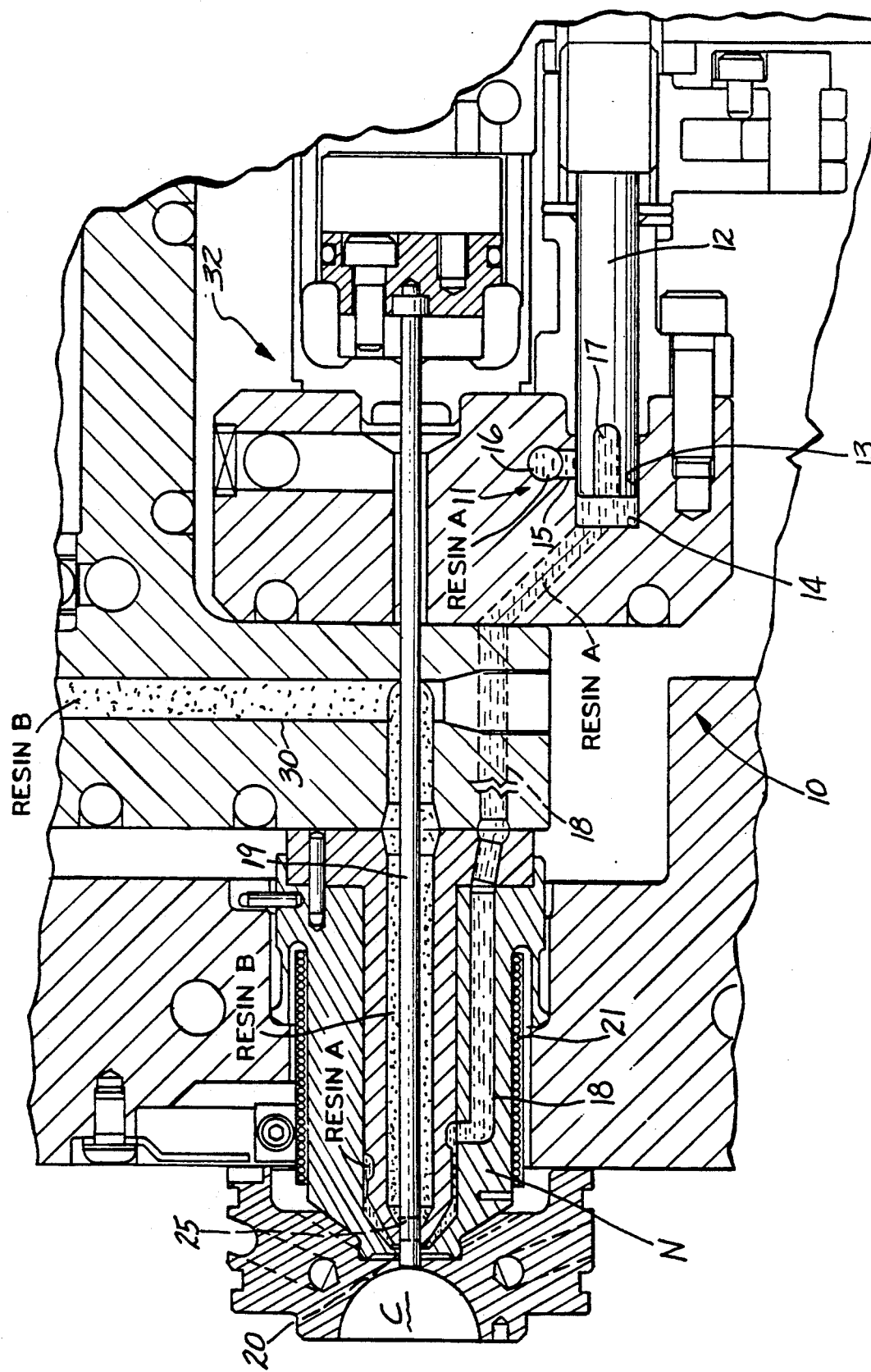
FIG. 1 is a schematic view of a portion of a hot runner manifold of the type incorporating a plurality of shooting pots or metering devices. Only one shooting pot, charged and poised to expel thermoplastic material, is shown.

Referring in detail to FIG. 1, the reference numeral 10 designates a portion of a hot runner assembly having a shooting pot or metering device 11 including a piston means 12 movable within cylinder means 13 having a first reservoir 14 supplied by suitable thermoplastic material labelled resin A from a source, such as an extruder or an injection unit, not shown, via conduit 16 and inlet 15 communicating with a second reservoir 17 defining a cut-out or recess in said piston means.

The first reservoir 14 communicates with mold cavity C via nozzle N and conduit 18 under control of nozzle valve stem 19 in well-known fashion.

The nozzle N is maintained at appropriate temperature by heating elements 21 and by heat conducted by manifold heaters adjacent nozzle N.

Figure 2:
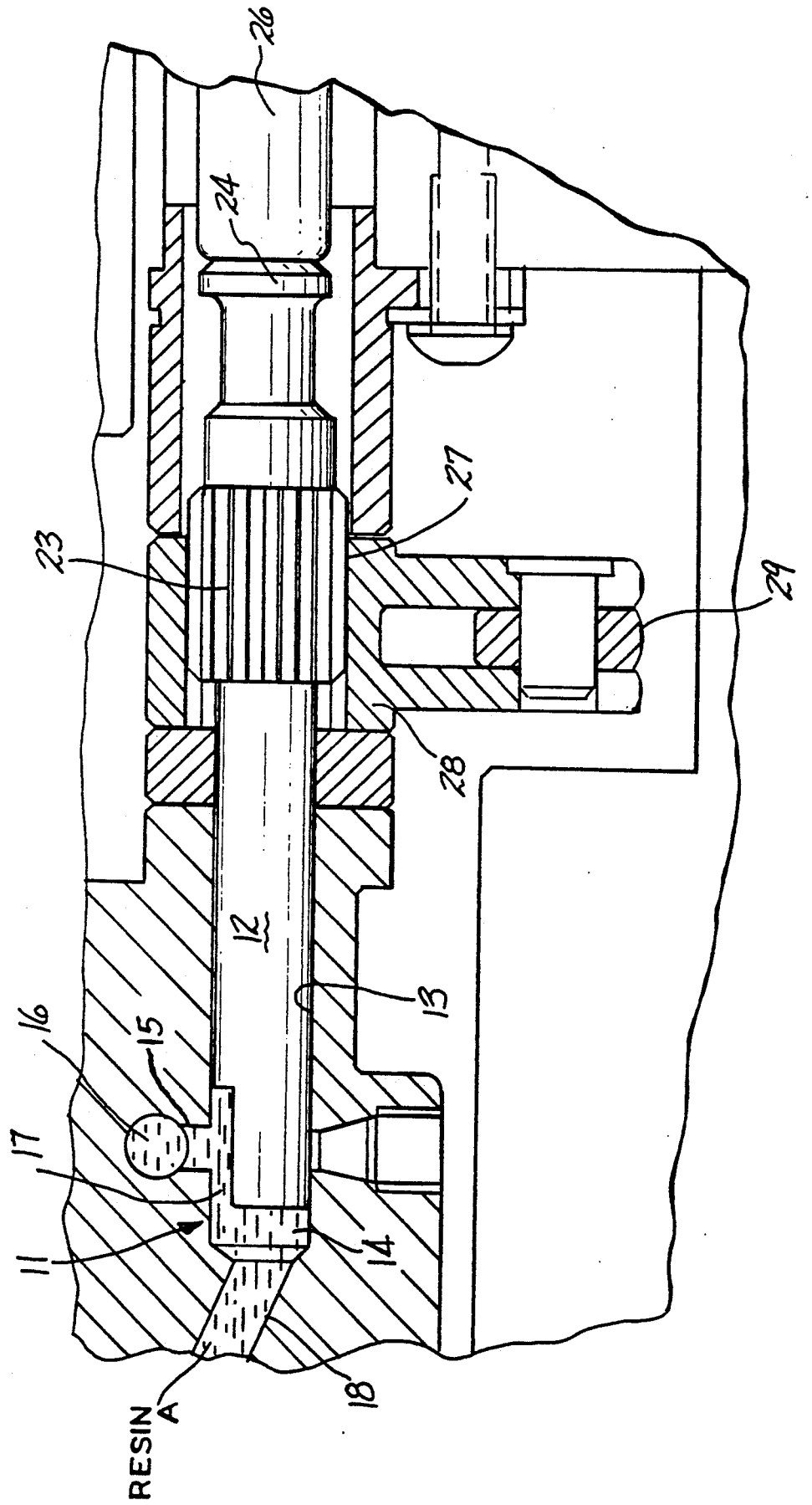
FIG. 2 is an enlarged sectional view of a portion of FIG. 1 showing the piston means of the shooting pot in the charging position.
Figure 3:
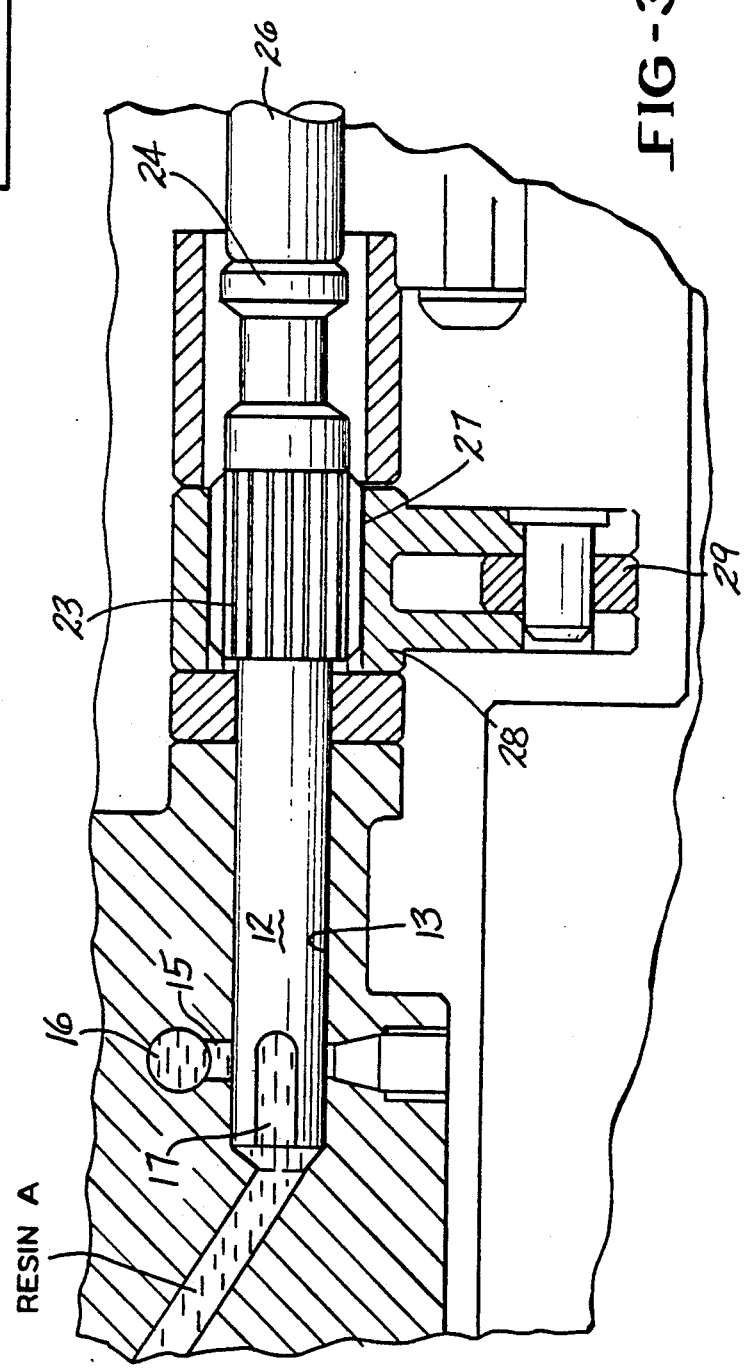
FIG. 3 shows the shooting pot at the end of the injection stroke.

As is more apparent in FIGS. 2 and 3, the piston means includes a peripheral cut-out defining said second reservoir 17, a splined portion 23 and a head 24 in contact with an adjustable actuator 26.

Figure 4:
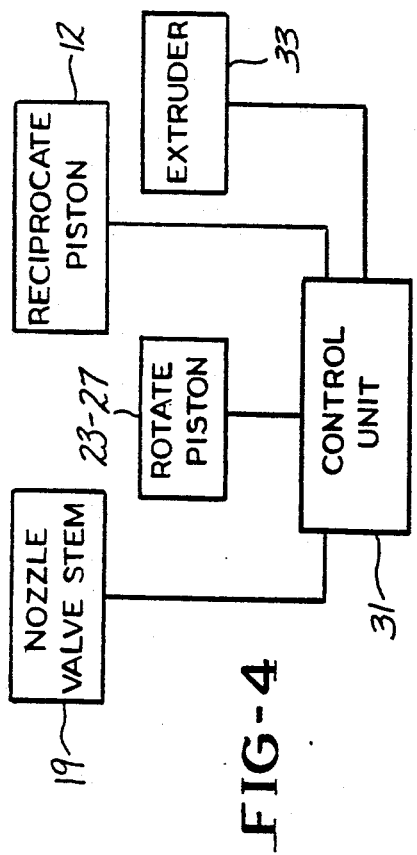
FIG. 4 shows, schematically, the control means for activating and synchronizing the various power means for reciprocating the piston means and the nozzle valve stem, for rotating the piston means and for operating an extruder or injection unit.

The piston spline 23 engages a matching spline 27 on arm 28 in turn connected to link 29 powered by suitable means (not shown) to rotate the piston to and from (clockwise and counterclockwise) through an arc of approximately 90 degrees under direction of control unit 31, FIG. 4.

In FIG. 1, the nozzle valve stem 19, actuated (reciprocated) by piston assembly 32 (also under direction of control unit 31) is shown closed to mold cavity C.

The valve stem 19 is movable from its closed position to a first or open position, indicated by the reference numeral 20, to admit resin A into the mold cavity C in response to an injection stroke of piston 12.

Optionally, the valve stem is movable further to a second position, indicated by the reference numeral 25, to admit resin B originating from a separate source via passage 30.

When the valve stem is in the second position the valve action of piston 12 prevent backflow of resin B into the loaded conduit 18.

FIG. 2 shows the shooting pot 11 in the charging position in that conduit 18 is filled with resin A (from previous cycle) and the extruder or injection unit source is charging the first reservoir 14 through conduit 16, via inlet 15 and cut-out 17.

As will be more apparent as the specification proceeds, the charging step also drives the piston 12 to the right to the position shown in FIG. 2.

In the fully charged condition a known, precise volume of thermoplastic material is contained within the conduit 18, the first reservoir 14 and the second reservoir 17. Whereupon, in timed sequence, control unit 31 actuates power means (not shown) to move link 29 and arm 28 to rotate piston 12 (counterclockwise as viewed from the right) from the position of FIG. 2 (first position) to the position of FIG. 1 (second position).

During this occurrence the piston 12 acts as a valve to close inlet 15.

Thereafter, in timed sequence, under direction of control unit 31, actuator 26 drives piston 12 linearly through a precisely measured stroke to the third position (FIG. 3) thereby delivering a precise volume of material to mold cavity C.

Obviously, control unit 31 also signals piston assembly 32 to draw nozzle valve stem 19 to the open position 20 (FIG. 1) in simultaneous or sequential fashion, facilitating delivery of said precise volume of material to mold cavity C. That is, there may be a short time delay following initiation of piston ejection stroke and movement of valve stem 19 to open position 20.

Hereinafter the language "sequentially" is intended to indicate a short time delay of the order of 0.01 to 4.0 seconds.

Note that the third position of piston 12 (FIG. 3) is such that the right end of the second reservoir 17 is in registration with inlet 15 so that after an appropriate interval and in timed sequence, under direction of control unit 31, the piston 12 is rotated clockwise (as viewed from the right in FIG. 3) whereupon valve action of the piston opens inlet 15 to first reservoir 14 via second reservoir 17. Valve stem 19 is advanced by piston 32 to close nozzle passage to cavity C.

In cyclic fashion, under direction of control unit 31, delivery of thermoplastic material is called for from extruder injection unit 33 whereupon hydraulic pressure drives piston 12 linearly in opposition to actuator 26 causing the piston to return to the first position of FIG. 2.

It is to be noted that during the course of recharging reservoir 14 and during the return stroke of piston 12 second reservoir 17 is purged of material remaining from previous cycle as the new charge of material enters inlet 15.

That is, material contained in reservoir 17 remains static during movement of the piston 12 from the second position to the third position and remains so only for one cycle.

Thus, the risk of overheating the thermoplastic material, static momentarily, in the second reservoir is avoided.

The record should show that a normal time interval during which the piston 12 acts dually as a valve means and as a metering device is of the order of 10 to 60 seconds.

OPERATION

With the nozzle valve stem 19 in the closed position assume that the extruder has filled the system with thermoplastic material (resin A) and the piston 12 is in the first position as shown in FIG. 2 set with proper length of stroke.

Upon appropriate signal from the control means the piston means is rotated to its second position (FIG. 1).

Thereafter the piston is directed to expel material from the first reservoir and simultaneously or sequentially the valve stem 19 is moved to its open position 20.

After the piston bottoms (third position, FIG. 3) the piston is rotated to its first position and simultaneously or sequentially the valve stem is moved to its closed position.

Conduit 18 remains filled with thermoplastic material and the extruder is directed to inject material through inlet 15, purging the second reservoir 17 of material remaining from the previous cycle. Fluid pressure acts upon the face of the piston to drive it to the right in opposition to its actuator 26 returning it to its starting position as shown in FIG. 1.

Thereafter the cycle is repeated.

While the piston valve arrangement is shown and described with respect to a single shooting pot servicing a single mold cavity it is entirely within the spirit and scope of the present invention that there be a plurality of shooting pots within a hot runner system servicing a corresponding plurality of mold cavities where there is a shooting pot individual to each mold cavity.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A metering device for inclusion in a conduit means, said conduit means providing a single path for advancing precise quantities of a thermoplastic material from a source of said material to a mold cavity via a hot runner system including a nozzle means for delivering said material to said mold cavity, said nozzle means having a valve stem communicating with said mold cavity, said metering device comprising:

a cylinder means for housing a piston means within said hot runner system, spaced from and independent of said valve stem, a piston means within said cylinder means for injecting said material, a first reservoir in said cylindrical means for receiving said material, said first reservoir having inlet means communicating with said source, via said conduit means, providing entry into said cylindrical means and outlet means providing a connection with said conduit means communicating with said nozzle means, means for rotating and means for reciprocating said piston means, said piston means being movable in a first direction from a first position wherein said inlet means is open to a second position wherein said inlet means is closed by said piston means to block back flow of said material into said conduit means, said piston means being movable further in a second direction to a third position to inject said material from said first reservoir through said outlet means toward said nozzle means whereby said piston means is operable dually to function as a valve and to function as a means for advancing said material.

2. The device of claim 1 in which motion in the first direction is a rotary motion and in the second direction is linear.

3. The device of claim 1 in which the piston means is formed with a recess which communicates with said inlet means when said piston means is in said first position.

4. The device of claim 3 in which the recess in said piston means defines a second reservoir for receiving said thermoplastic material, said second reservoir communicating with said inlet means and with said first reservoir when the piston means is in said first position.

5. The device of claim 4 in which the means for rotating said piston means is operable to rotate said piston means from said first position to said second position and from said second position to said first position.

6. The device of claim 5 in which the means for reciprocating said piston means is operable to move said piston means from said second position to said third position and from said third position to said second position through a precisely measured stroke.

7. The device of claim 6 including means for regulating and adjusting the stroke of the piston means.

8. The device of claim 5 wherein the first and second reservoirs communicate with one another and the inlet means is closed when the piston means is rotated to its second position.

9. The device of claim 6 wherein the second reservoir is closed substantially by said cylinder means so that when the piston means is moved from the second position to the third position, the thermoplastic material in said first reservoir is expelled and the thermoplastic material in said second reservoir remains static.

10. The device of claim 5 wherein the means for rotating the piston means rotates the piston means through an arc to move said second reservoir out of registration with said inlet means whereby said inlet means is closed.

11. The device of claim 6 including means for moving said valve stem to open a path from said nozzle means to said cavity and control means for synchronizing movement of said valve stem with movement of said piston means to said third position.

12. The device of claim 3 wherein the recess in the piston means defines a cut out at a forward end of the piston means.

13. The device of claim 1 including control means for sequencing the rotation and reciprocation of said piston means whereby the piston means is moved in the following sequence: first position to second position to third position to first position.

14. The device of claim 13 in which the control means is operable to move the nozzle valve stem to an open position in synchronism with the movement of the piston means from the second position to the third position.

15. The device of claim 13 in which said sequence defines a cycle of operation of said metering device and the control means is operable to effect repetition of said cycle.

* * * * *

UNITED STATES PATENT AND TRADEMARK OFFICE
CERTIFICATE OF CORRECTION

PATENT NO. : 5,112,212
DATED : May 12, 1992
INVENTOR(S) : Vitaly Akselrud and Stefan von Buren It is certified that error appears in the above-identified patent and that said Letters Patent is hereby corrected as shown below:

Column 6, Claim 1:

line 6, "cylindrical" should read --cylinder--;

line 10, "cylindrical" should read --cylinder--;

after line 12, insert as a separate paragraph

--said piston means being movable
      in said cylinder means,--.

Signed and Sealed this

Seventh Day of September, 1993

*Attest:*

BRUCE LEHMAN

*Attesting Officer*     Commissioner of Patents and Trademarks